(12) United States Patent
Hosono et al.

(10) Patent No.: US 7,336,447 B2
(45) Date of Patent: Feb. 26, 2008

(54) DISK DEVICE WITH INERTIA ARM RETAINING PORTION STEPPED UP FROM TOP YOKE

(75) Inventors: Tetsuya Hosono, Ome (JP); Akio Toda, Kitatsuru-gun (JP); Jun Nishida, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 364 days.

(21) Appl. No.: 11/094,391

(22) Filed: Mar. 31, 2005

(65) Prior Publication Data

US 2005/0219760 A1    Oct. 6, 2005

(30) Foreign Application Priority Data

Apr. 5, 2004  (JP)  ............... 2004-111296

(51) Int. Cl.
   *G11B 21/22*  (2006.01)
   *G11B 21/02*  (2006.01)
   *G11B 25/04*  (2006.01)
   *G11B 5/54*   (2006.01)
   *G11B 21/12*  (2006.01)

(52) U.S. Cl. ................. 360/256.4; 360/256.5; 360/264.8

(58) Field of Classification Search ............. 360/256.4, 360/256.5, 264.8, 256
   See application file for complete search history.

(56) References Cited

U.S. PATENT DOCUMENTS 6,400,533 B1    6/2002  Liu et al.
6,624,980 B1    9/2003  Watson et al.
2004/0027726 A1*  2/2004  Hong et al. ................. 360/256
2004/0264059 A1* 12/2004  Ooi et al. ................. 360/264.7

FOREIGN PATENT DOCUMENTS

JP  2000-222839      8/2000
JP  2002-100140      4/2002
JP  2003-051165 A    2/2003

OTHER PUBLICATIONS

Australian Search Report dated Mar. 7, 2006 for Singapore Appln. No. 200502147-2.

* cited by examiner

*Primary Examiner*—Craig A. Renner
(74) *Attorney, Agent, or Firm*—Pillsbury Winthrop Shaw Pittman, LLP

(57) ABSTRACT

An inertia latch mechanism has a latch arm, which latches a head actuator in a retreated position, and an inertia arm, which is rockably supported around a second pivot and rotates the latch arm to a latch position by rotating around the second pivot when subjected to an external force. A voice coil motor has a lower yoke, a top yoke, a voice coil attached to the head actuator and situated between the yokes, and a permanent magnet provided on at least one of the yokes. The top yoke has an arm retaining portion which extends overlapping the second pivot and that part of the inertia arm which is situated near the second pivot and restrains the inertia arm from slipping off the second pivot. The arm retaining portion is stepped to be one level higher than the top yoke.

5 Claims, 3 Drawing Sheets ived position on the outer periphery of the magnetic disk, whereupon a suspension runs onto the ramp. Thus, the magnetic head is held in the retreated position off the surface of the disk, so that it can be prevented from running against the disk when subjected to a shock.
DISK DEVICE WITH INERTIA ARM RETAINING PORTION STEPPED UP FROM TOP YOKE

CROSS-REFERENCE TO RELATED APPLICATIONS

This application is based upon and claims the benefit of priority from prior Japanese Patent Application No. 2004-111296, filed Apr. 5, 2004, the entire contents of which are incorporated herein by reference.

BACKGROUND OF THE INVENTION

1. Field of the Invention

This invention relates to a disk device provided with an inertia latch mechanism for a head actuator.

2. Description of the Related Art

In recent years, magnetic disk devices have been widely used, for example, as high-capacity disk devices in electronic apparatuses, such as personal computers. In general, a magnetic disk device comprises a magnetic disk housed in a case, a spindle motor that supports and rotates the magnetic disk, a head actuator that supports a magnetic head, a voice coil motor (hereinafter referred as a VCM) for driving the head actuator, a substrate unit, etc. The VCM includes a voice coil attached to the head actuator and a pair of yokes and permanent magnets mounted on the case side.

Compact portable personal computers have been increasing popularity in recent years. Magnetic disk devices that are mounted in the personal computers of this type are expected to be improved in reliability against impact or the like that may be caused as they are carried about.

Proposed, therefore, is a magnetic disk device that comprises a ramp load mechanism for holding the magnetic head in a given position when the device is non-operating. The ramp load mechanism is provided with a ramp that is located outside the magnetic disk. When the magnetic disk device is non-operating, the head actuator is rotated to a retreated position on the outer periphery of the magnetic disk, whereupon a suspension runs onto the ramp. Thus, the magnetic head is held in the retreated position off the surface of the disk, so that it can be prevented from running against the disk when subjected to a shock.

Also proposed is a magnetic disk device of this type that is provided with an inertia latch mechanism, which serves to enhance the shock resistance. If the magnetic disk device suffers an impact while not operating, the inertia latch mechanism engages a head actuator to restrain it from rotating, thereby holding the actuator in a retreated position.

According to a disk drive described in Jpn. Pat. Appln. KOKAI Publication No. 2003-51165, for example, an inertia latch mechanism comprises an inertia arm and a latch arm. The inertia arm has its center of gravity off its center of rotation, so that it is rotated in both forward and reverse directions by external shock acceleration. The latch arm is urged to rotate in one direction by the rotation of the inertia arm. If the disk drive in a non-operating state is subjected to a shock, a latch claw that protrudes from the distal end of the latch arm engages a head actuator, thereby holding the actuator in a retreated position.

In the inertia latch mechanism constructed in this manner, the inertia arm and the latch arm are rockably supported by a pivot that is attached to a case. The latch arm has a latch claw that engages the head actuator. The latch claw extends substantially at right angles to the bottom surface of the case so that it can engage and disengage from the head actuator with a small movement. Further, a fulcrum portion of the inertia arm is prevented from slipping off the pivot by a pivot retaining portion that is attached to a yoke of a VCM.

A top yoke and a bottom yoke that constitute a modern VCM are optimized so that they are thinned and that gaps between permanent magnets and a coil are narrowed. By doing this, the VCM can be thinned as a whole. Since the latch claw of the inertia latch mechanism extends substantially at right angles to the case bottom surface, however, a certain dimension in the height direction must be secured. It is difficult, therefore, to combine the latch claw with the thin VCM. If the inertia latch mechanism is thinned with the reduction in thickness of the VCM, it is hard to use the vertically extending latch claw, so that the function of the latch claw cannot be maintained.

BRIEF SUMMARY OF THE INVENTION

According to an embodiment of the invention, a disk device comprises: a base; a disk-shaped recording medium; a drive unit which is arranged on the base and supports and rotates the recording medium; a head which processes information for the recording medium; a head actuator which is arranged on the base, supports the head for movement with respect to the recording medium, and is movable between a retreated position in which the head actuator is situated on the outer peripheral side of the recording medium and an information processing position over the recording medium; a voice coil motor which moves the head actuator between the retreated position and the information processing position; and an inertia latch mechanism which latches and holds the head actuator in the retreated position when the head actuator moved to the retreated position is subjected to an external force. The inertia latch mechanism includes a latch arm rotatable around a first pivot, which extends substantially perpendicular to the base, between a latch position in which the latch arm engages the head actuator to latch it in the retreated position and a release position in which the latch arm disengages from the head actuator and unlatches thereby, and an inertia arm which is rockably supported around a second pivot extending substantially perpendicular to the base and rotates the latch arm from the release position to the latch position by rotating around the second pivot when subjected to an external force. The voice coil motor includes a lower yoke provided on the base, a top yoke facing the lower yoke across a gap, a voice coil attached to the head actuator and situated between the lower yoke and the top yoke, and a permanent magnet provided on at least one of the yokes and opposed to the voice coil. The top yoke has an arm retaining portion which extends overlapping the second pivot and that part of the inertia arm which is situated near the second pivot and restrains the inertia arm from slipping off the second pivot, the arm retaining portion being stepped to be one level higher than the top yoke.

DETAILED DESCRIPTION OF THE INVENTION

An embodiment in which this invention is applied to a magnetic disk device will now be described in detail with reference to the accompanying drawings.

Figure 1:
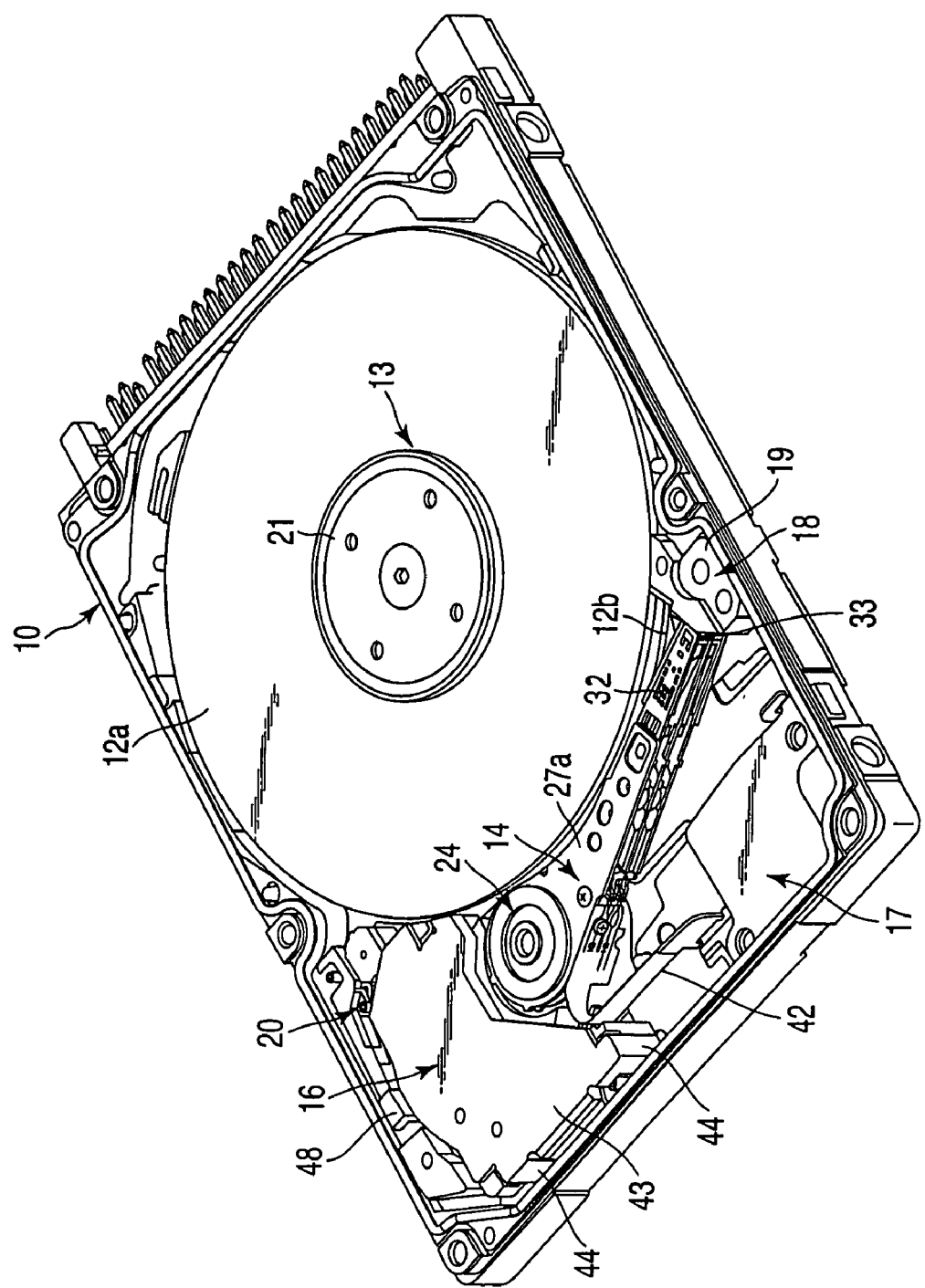
FIG. 1 is a perspective view showing a hard disk drive (hereinafter referred as an HDD) according to an embodiment of the invention.

As shown in FIG. 1, an HDD comprises a case 10 in the form of an open-topped rectangular box and a top cover, which is fixed to the case by screws and closes a top opening of the case. The case 10 has a substantially flat bottom wall 11 that serves as a base.

The case 10 contains two magnetic disks 12a and 12b for use as recording media, spindle motor 13, magnetic heads, head actuator 14, VCM 16, ramp load mechanism 18, inertia latch mechanism 20, and flexible printed circuit board unit (hereinafter referred as an FPC unit) 17. The magnetic heads record and reproduce information to and from the magnetic disks. The head actuator 14 supports the magnetic heads for movement relative to the magnetic disks 12a and 12b. The VCM 16 rotates and positions the head actuator. The ramp load mechanism 18 holds the magnetic heads at distances from the magnetic disks when the heads are moved to the outermost peripheries of the disks. The inertia latch mechanism 20 holds the head actuator in a retreated position. Circuit components, such as a pre-amplifier, are mounted on the FPC unit 17.

A printed circuit board (not shown) is screwed to the outer surface of the bottom wall 11 of the case 10 and situated opposite the case bottom wall. It controls the operations of the spindle motor 13, VCM 16, and magnetic heads through the FPC unit 17.

Each of the magnetic disks 12a and 12b is 65 mm (2.5 inches) in diameter, for example, and has magnetic recording layers on its upper and lower surfaces, individually. The two disks 12a and 12b are coaxially fitted on a hub (not shown) of the spindle motor 13 and clamped by a clamp screw 21. They are stacked in layers at a given space in the axial direction of the hub. The magnetic disks are rotated at a given speed by the motor 13 as a drive unit.

Figure 2:
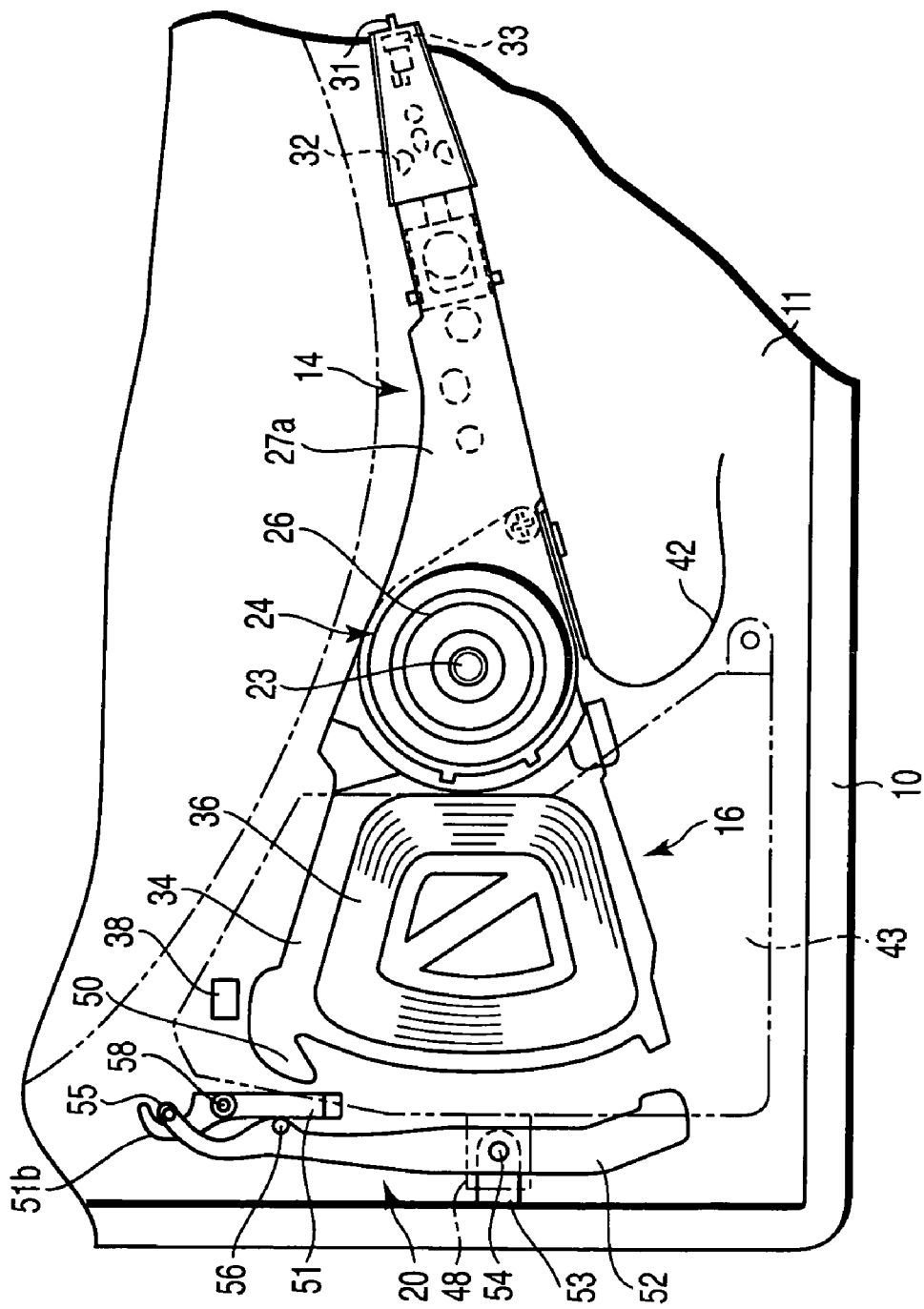
FIG. 2 is a plan view showing a head actuator assembly, VCM, and inertia latch mechanism of the HDD.
Figure 3:
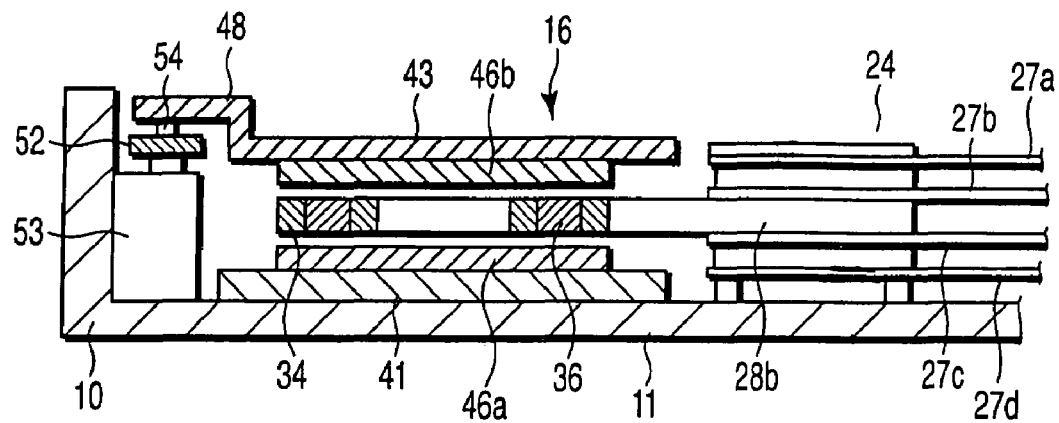
FIG. 3 is a sectional view showing the VCM and the inertia latch mechanism of the HDD.

As shown in FIG. 1 to 3, the head actuator 14 comprises a bearing assembly 24 fixed on the bottom wall of the case 10. The bearing assembly 24, which serves as a bearing portion, has a pivot 23 set up on the bottom wall 11 of the case 10 and a cylindrical hub 26 that is rotatably supported on the pivot by a pair of bearings. The head actuator 14 has four arms 27a, 27b, 27c and 27d mounted on the hub 26 and extending in the same direction, and elastically deformable elongate suspensions 32 attached individually to the respective extended ends of the arms. A magnetic head 33 is supported on the extended end of each suspension by a gimbals (not shown).

The head actuator 14 is rotatable around the bearing assembly 24. Two pairs of magnetic heads 33 that are supported on the arms 27a to 27d by the suspensions 32 are rotatable integrally with the arms and the suspensions and movable to any desired information processing positions on the magnetic disks 12a and 12b and a retreated position (mentioned later). Each magnetic head 33 is connected electrically to the FPC unit 17 by a flexible cable 42.

The head actuator 14 has a support frame 34 that extends in the opposite direction from a spacer ring 28b with respect to the arms. The frame 34 is formed integrally with the spacer ring 28b from a synthetic resin, for example. A voice coil 36 is embedded integrally in the support frame 34. The coil 36, along with a pair of yokes and a permanent magnet fixed on the bottom wall 11 of the case 10, constitutes the VCM 16.

The yokes include a plate-shaped lower yoke 41, a plate-shaped top yoke 43, and side yokes 44. The lower yoke 41 is fixed on the bottom wall 11 of the case 10 and extends parallel to the bottom wall. The top yoke 43 is located opposite and parallel to the lower yoke with a gap between them. The side yokes 44 connect the lower and top yokes. Platelike permanent magnets 46a and 46b are fixed individually to the respective inner surfaces of the lower yoke 41 and the top yoke 43 and face each other across a gap.

The top yoke 43 is provided integrally with an arm retaining portion 48 that projects radially with respect to the bearing assembly 24. The retaining portion 48 is formed with a height level advantage over the top yoke 43. More specifically, the retaining portion 48 is stepped to be one level higher than the top yoke 43 in the direction away from the bottom wall 11 of the case 10 and extends substantially parallel to the top yoke.

When the head actuator 14 is in the case 10, the voice coil 36 that is fixed to the support frame 34 is situated between the pair of permanent magnets 46a and 46b. When the coil 36 is energized, the actuator 14 rotates, whereupon the magnetic heads 33 are moved to and positioned over desired tracks of the disks 12a and 12b.

The ramp load mechanism 18 includes a ramp 19 and a tab 31. The ramp 19 is provided on the bottom wall 11 of the case 10 and situated on the outer peripheral side of the magnetic disks 12a and 12b. The tab 31 extends from the distal end of each suspension 32. When the head actuator 14 is moved to the retreated position, the tab 31 is supported on a guide surface of the ramp 19. In the vicinity of the support frame 34 of the head actuator 14, as shown in FIG. 2, the case 10 is provided with a stopper block 38 that prevents the actuator from rotating beyond the retreated position.

Figure 4:
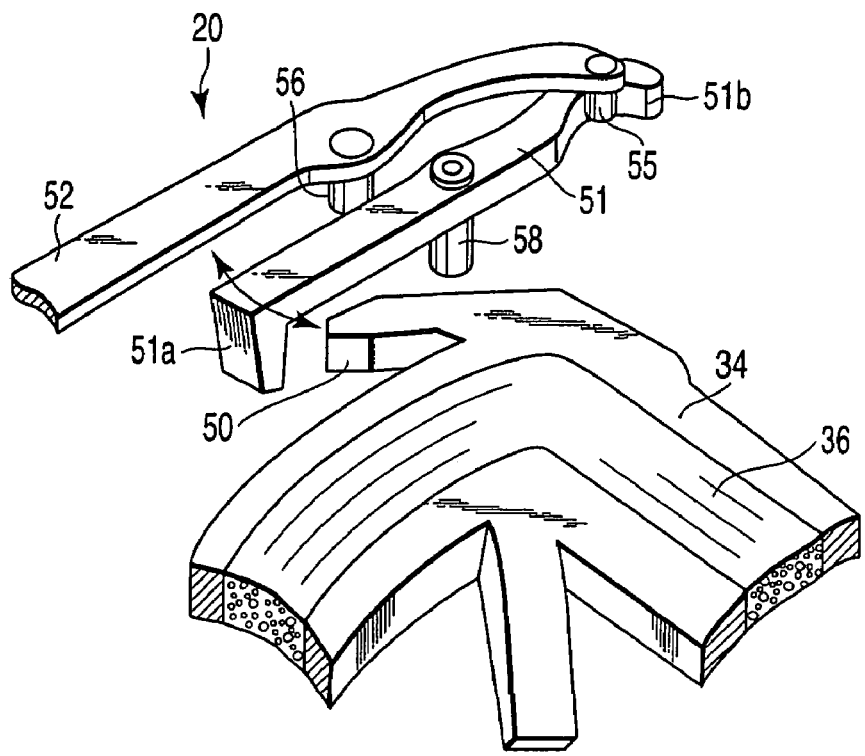
FIG. 4 is an enlarged perspective view showing the inertia latch mechanism and an engaging lug of a head actuator.

If the head actuator 14 is subjected to any external force, such as an impact when it is situated in the retreated position and non-operating, the inertia latch mechanism 20 is actuated to latch the actuator 14 in the retreated position. As shown in FIG. 2 to 4, the latch mechanism 20 is provided with an engaging lug 50, which projects outward from the support frame 34 of the actuator 14, that is, in the radial direction with respect to the bearing assembly 24. The latch mechanism 20 is provided with a latch arm 51 and an inertia arm 52 that adjoin the outside of the support frame 34 in the radial direction.

The latch arm 51 extends substantially parallel to the bottom wall 11 of the case 10 and is supported so as to be rotatable around a pivot 58, which is set upright on the bottom wall 11 and extends parallel to the bearing assembly 24. The arm 51 has a latch claw 51a and a hook 51b. The latch claw 51a is situated on the side of the engaging lug 50 of the support frame 34 with respect to the pivot 58 that serves as a first pivot. The hook 51b is situated on the opposite side of the pivot 58 from the claw 51a. The latch claw 51a extends substantially at right angles to the bottom wall 11 of the case 10, that is, substantially parallel to the pivot 58, from the latch arm toward the bottom wall. The distance between the pivot 58 and the latch claw 51a is longer than the distance between the pivot 58 and the hook 51b.

The latch arm 51 is rotatable around the pivot 58 between a release position illustrated and a latch position in which the latch claw 51a engages the engaging lug 50. If any external force, such as an impact, acts on the case 10, the latch arm 51 is rotated from the release position to the latch position by the action of the inertia arm 52, which will be mentioned later. Thereupon, the latch claw 51a engages the engaging lug 50 of the head actuator 14, thereby latching the actuator 14 in the retreated position.

The inertia arm 52 extends substantially parallel to the bottom wall 11 of the case 10 and is spaced wider apart from the bottom wall 11 than the latch arm 51. A part of the inertia arm 52 overlies the latch arm 51. The inertia arm 52 is rockably supported around a pivot 54. The pivot 54 that serves as a second pivot is set up on a boss 53, which protrudes from the bottom part of the case 10, and extends substantially parallel to the bearing assembly 24. The pivot 54 is one-sidedly located near one end portion of the inertia arm 52 and kept sufficiently apart from the pivot 58 of the latch arm 51.

A pin 55 protrudes toward the bottom wall 11 of the case 10 from the other end portion of the inertia arm 52 that is distant from the pivot 54. The pin 55 is situated between the latch arm 51 and the head actuator 14 so as to be able to engage the hook 51b of the arm 51. A pin 56 protrudes toward the arm 51 from that part of the inertia arm 52 which is situated halfway between the pivot 54 and the pin 55. The pin 56 faces the arm 51 on the opposite side from the actuator 14 and is situated on the opposite side of the pivot 58 of the arm 51 from the pin 55.

The inertia arm 52 is prevented from slipping off the pivot 54 and held in a desired support state by the arm retaining portion 48 that extends from the top yoke 43. As shown in FIG. 3, the retaining portion 48 overlies the pivot 54 and a support portion of the arm 52 that is situated near the pivot, and faces the boss 53 across the pivot 54 and that part of the inertia arm which is situated near the second pivot. Thus, the arm retaining portion 48 prevents the arm 52 from slipping off.

If any external force, such as an impact, acts on the case 10, the inertia arm 52 rotates clockwise or counterclockwise around the pivot 54, depending on the direction of action of the external force, thereby pressing the latch arm 51 through the pins 55 and 56. If the inertia arm 52 rotates clockwise around the pivot 54, for example, the pin 56 presses the latch arm 51, whereupon the latch arm rotates counterclockwise. If the inertia arm 52 rotates counterclockwise around the pivot 54, moreover, the pin 55 presses the hook 51b of the latch arm 51, whereupon the latch arm rotates counterclockwise. When the latch arm 51 rotates counterclockwise in this manner, the latch claw 51a engages the engaging lug 50 of the head actuator 14, whereupon the head actuator is latched in the retreated position.

According to the HDD constructed in this manner, the head actuator 14 is rotated by the VCM 16 in normal operation. By doing this, the magnetic heads 33 are moved onto desired tracks of the magnetic disks 12a and 12b, whereupon information is recorded to or reproduced from the magnetic disks. When the head actuator 14 is rotated from its operating position toward the illustrated retreated position by the VCM 16 as a magnetic disk device 1 is shifted to its non-operating state, the magnetic heads 33 move from the inner peripheral side of disks 12a and 12b toward the outermost peripheries thereof. When the heads 33 move close to the outer peripheral edges of the disks 12a and 12b, the tabs 31 that extend individually from the suspensions 32 project outward from the disk edges and are individually supported by the ramp 19 of the ramp load mechanism 18. Thus, the magnetic heads 33 are unloaded to be off the surfaces of the magnetic disks 12a and 12b.

If any great external force, such as an external impact, acts on the case 10 when the HDD is non-operating, for example, the inertia latch mechanism 20 is actuated by the force of inertia and latches the head actuator 14 in the aforesaid manner. Thus, the actuator 14 can be fully prevented from rotating from the retreated position toward the magnetic disks 12a and 12b. If the external force that acts on the HDD is removed, the latch mechanism 20 is restored to an unlatched state by return means (not shown), whereupon the latch arm 51 is kept in the release position. Thus, the inertia latch mechanism 20 operates only when an external force acts on the HDD.

According to the HDD constructed in this manner, the arm retaining portion 48 that prevents the inertia arm 52 from slipping off and holds it in a given position is stepped to be one level higher than the top yoke 43. If the whole VCM is thinned by optimizing the yokes and the permanent magnets, therefore, the arm 52 can be located in a high position that is sufficiently apart from the case bottom wall 11. If the latch claw 51a of the latch arm 51 is formed extending at right angles to the bottom wall 11, therefore, a high enough space can be secured to allow the movement of the latch claw 51a. Accordingly, the head actuator 14 can be latched by the claw 51a as the arm 51 is slightly rotated around the pivot 58. Thus, the HDD that ensures high-efficiency operation of the inertia latch mechanism can be obtained even with use of the thinned VCM 16.

The present invention is not limited directly to the embodiment described above, and its components may be embodied in modified forms without departing from the scope or spirit of the invention. Further, various inventions may be made by suitably combining a plurality of components described in connection with the foregoing embodiment. For example, some of the components according to the foregoing embodiment may be omitted. Furthermore, components according to different embodiments may be combined as required.

The number of magnetic disk(s) in the HDD is not limited to one and may be increased as required. This invention is not limited to magnetic disk devices and may be also applied to any other disk devices, such as optical disk devices.

What is claimed is:
1. A disk device comprising:
a base;
a disk-shaped recording medium;
a drive unit which is arranged on the base and supports and rotates the recording medium;
a head which processes information for the recording medium;
a head actuator which is arranged on the base, supports the head for movement with respect to the recording medium, and is movable between a retreated position in which the head actuator is situated on the outer peripheral side of the recording medium and an information processing position over the recording medium;
a voice coil motor which moves the head actuator between the retreated position and the information processing position; and
an inertia latch mechanism which latches and holds the head actuator in the retreated position when the head actuator moved to the retreated position is subjected to an external force,
the inertia latch mechanism including a latch arm rotatable around a first pivot, which extends substantially perpendicular to the base, between a latch position in which the latch arm engages the head actuator to latch it in the retreated position and a release position in which the latch arm disengages from the head actuator and unlatches thereby, and an inertia arm which is rockably supported around a second pivot extending substantially perpendicular to the base and rotates the latch arm from the release position to the latch position by rotating around the second pivot when subjected to an external force, the voice coil motor including a lower yoke provided on the base, a top yoke facing the lower yoke across a gap, a voice coil attached to the head actuator and situated between the lower yoke and the top yoke, and a permanent magnet provided on at least one of the yokes and opposed to the voice coil, the inertia latch mechanism having an arm retaining portion which extends from the top yoke, overlaps the second pivot and that part of the inertia arm which is situated near the second pivot and restrains the inertia arm from slipping off the second pivot, the arm retaining portion being stepped to be one level higher than the top yoke in a direction away from the base and extending in parallel to the top yoke.

2. The disk device according to claim 1, wherein the arm retaining portion extends integrally from the top yoke.

3. The disk device according to claim 1, wherein the latch arm has a latch claw extending at right angles to the base from the latch arm and capable of engaging the head actuator.

4. The disk device according to claim 1, which further comprises a boss protruding from the base, the second pivot being set up on the boss, and the arm retaining portion facing the boss across the second pivot and that part of the inertia arm which is situated near the second pivot.

5. The disk device according to claim 4, wherein the inertia arm is located on a level which is the same or higher than the level of the top yoke with respect to the base.

* * * * *